United States Patent
Farrugia et al.

(10) Patent No.: US 11,041,077 B2
(45) Date of Patent: Jun. 22, 2021

(54) PARTICLES FOR POWDER COATING APPLICATIONS AND METHOD OF MANUFACTURING

(71) Applicant: Xerox Corporation, Norwalk, CT (US)

(72) Inventors: Valerie M. Farrugia, Oakville (CA); Sandra J. Gardner, Oakville (CA)

(73) Assignee: Xerox Corporation, Norwalk, CT (US)

(*) Notice: Subject to any disclaimer, the term of this patent is extended or adjusted under 35 U.S.C. 154(b) by 80 days.

(21) Appl. No.: 16/291,165

(22) Filed: Mar. 4, 2019

(65) Prior Publication Data

US 2020/0283641 A1    Sep. 10, 2020

(51) Int. Cl.
| | |
|---|---|
| C09D 5/03 | (2006.01) |
| C09D 167/02 | (2006.01) |
| B05D 1/06 | (2006.01) |
| C09C 1/24 | (2006.01) |
| C09C 3/10 | (2006.01) |

(52) U.S. Cl.
CPC ............... *C09D 5/036* (2013.01); *B05D 1/06* (2013.01); *C09C 1/24* (2013.01); *C09C 3/10* (2013.01); *C09D 5/031* (2013.01); *C09D 5/035* (2013.01); *C09D 167/02* (2013.01)

(58) Field of Classification Search
None
See application file for complete search history.

(56) References Cited

U.S. PATENT DOCUMENTS

| | | |
|---|---|---|
| 2009/0136737 A1 | 5/2009 | Ring et al. |
| 2010/0003522 A1 | 1/2010 | Zhong et al. |
| 2010/0075247 A1 | 3/2010 | Jin et al. |

FOREIGN PATENT DOCUMENTS

WO    2012071013 A1    5/2012

OTHER PUBLICATIONS

Baharvand, "Encapsulation of ferromagnetic iron oxide particles by polyester resin," e-polymers 2008, No. 102, 9 pgs. (Year: 2008).*
Baharvand, "Encapsulation of ferromagnetic iron oxide particles by polyester resin," e-polymers 2008, No. 102, 9 pgs.
Baharvand, "Preparation and Characterization of Fluorescent Polymer Magnetic Particles," Journal of Applied Polymer Science, vol. 109, 1823-1828 (2008), 6 pgs.
EP Search Report and Written Opinion for corresponding EP Application No. 20160807.2 dated Jun. 29, 2020, 13 pgs.

* cited by examiner

Primary Examiner — Alexander M Weddle
(74) Attorney, Agent, or Firm — Hoffman Warnick LLC

(57) ABSTRACT

Described herein is a powder coating that includes a plurality of particles. The plurality of particles includes amorphous polyester and iron oxide pigment, wherein the plurality of particles have a size of from 5 microns to 250 microns, and wherein the plurality of particles each have a circularity of from about 0.93 to about 0.999. A method of manufacturing the particles is also disclosed.

16 Claims, 3 Drawing Sheets

PARTICLES FOR POWDER COATING APPLICATIONS AND METHOD OF MANUFACTURING

BACKGROUND

Field of Use

This disclosure is generally directed to powder coatings and their manufacture.

Background

The present disclosure is directed to a process for preparing particles particularly suitable for powder coatings. The particles disclosed herein may be used to provide chemical resistant coatings that are lightfast, heat resistant and chemically resistant.

Over the last decade there has been a trend of decoration, hand-in-hand with durability, of construction and finishing/building materials with trendy structural design and enhanced color schemes. The demand for vibrant-colored powder coatings that are heat stable such as those formulated with inorganic pigments, specifically iron oxide, are rapidly growing compared to organic pigments and clear coats. Powder coating applications in general are on the rise due to its environmentally-sound process. Powder coatings contain no solvent in their application making emissions of volatile organic compounds (VOCs) or hazardous air pollutants (HAPs) very low, especially when compared to conventional solvent-borne coatings. Manufacturing of powder for powder coating is typically achieved through melt extrusion and pulverization, milling or grinding to a suitable particle size.

It would be desirable to have particles for powder coatings that are uniform in size, spherical and can be manufactured in an efficient manner.

SUMMARY

Disclosed herein is a process that includes forming a composition of an amorphous polyester, a polymeric stabilizer, and an iron oxide pigment in a water-miscible organic solvent, wherein the amorphous polyester and polymeric stabilizer are solubilized in the water miscible organic solvent. The method includes dispersing a polyvinyl alcohol aqueous solution containing colloidal silica into the composition, while mixing, to form a dispersion containing precipitated particles of polyester and iron oxide pigment. The method includes separating the precipitated particles.

Additionally, disclosed herein is a powder coating that includes a plurality of particles. The plurality of particles includes amorphous polyester and iron oxide pigment, wherein the plurality of particles have a size of from 5 microns to 250 microns. The plurality of particles each have a circularity of from about 0.93 and about 0.999.

Further, there is disclosed herein a method of coating a substrate. The method includes providing a plurality of particles comprising amorphous polyester and iron oxide pigment, wherein the plurality of particles have a size of from 5 microns to 250 microns and wherein the plurality of particles each have a circularity of from about 0.93 and about 0.999. The method includes electrostatically applying the plurality of particles to the substrate and heating the plurality of particles to a temperature above the melting point of the amorphous polyester.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

In the following description, reference is made to the chemical formulas that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Iron oxide pigments are quite relevant in automobile coatings, cosmetics and plastics. The addition of iron oxide pigments to powder coating formulations is through dry mixing. The ability to form spherical particles of relatively small size is a challenge and not known in the powder coating industry. Conventional powder coatings containing iron oxide pigments are manufactured by combining iron oxide pigments with a polymer resin, such as amorphous polyester, and a curing agent to create a formulation. The formulation is melt mixed or extruded and then ground into particles. Such processes require high energy in the grinding step and do not produce spherical particles.

Figure 1:
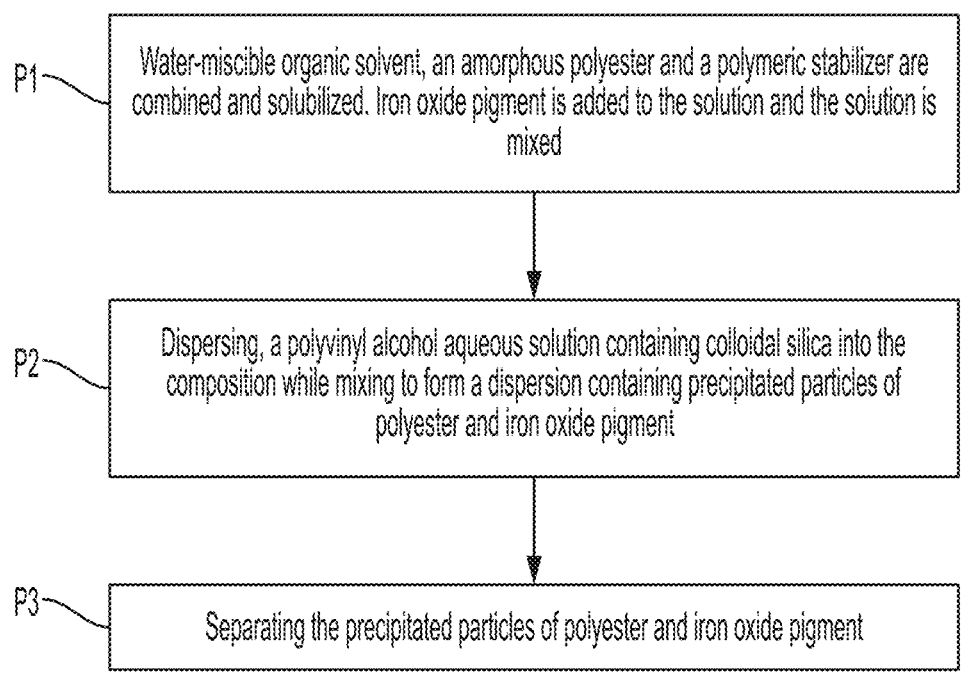
FIG. 1 is a flow chart of the method for manufacturing the powder coating particles disclosed herein.

Embodiments herein enable the manufacture of iron oxide pigment containing particles suitable for powder coating. The particles do not require grinding. The manufacturing process creates spherical particles. Shown in FIG. 1 is a flow chart of the method for manufacturing the particles described herein.

Process P1: A water-miscible organic solvent, an amorphous polyester and a polymeric stabilizer are combined and solubilized. Iron oxide pigment is added to the solution and the solution is mixed. In embodiments, colloidal silica may be added to the water-miscible organic solvent. The dissolution of the polyester in the water-miscible organic solvent in P1 can be aided by heating the solvent. Iron oxide pigments are then added to the solution containing the dissolved polyester. Stirring of the composition can be performed at any suitable or desired speed. In embodiments, a stirring speed of from about 100 to about 650 rpm (revolutions per minute) is selected. In embodiments, a dissolution temperature is from about 60 to about 150° C.

Process P2: Dispersing, a polyvinyl alcohol aqueous solution containing colloidal silica into the composition from P1 while mixing to form a dispersion containing precipitated particles of polyester and iron oxide pigment. The mixing can be performed at any suitable or desired speed. In embodiments, a stirring speed of from about 100 to about 650 rpm (revolutions per minute) is selected. Precipitation temperature can be any suitable or desired temperature. In embodiments, a precipitation temperature is from about 60° C. to about 150° C.

Process P3: Separating the precipitated particles of polyester and iron oxide pigment. The separation of the precipitated particles can be accomplished be filtering, centrifugation, or by freezing and removal of the frozen solvent by sublimation.

The process herein can further comprise additional steps such as re-suspending the formed polyester particles containing iron oxide pigment in water; mixing; and optionally, centrifuging; to form concentrated polyester particles containing iron oxide pigment. The process herein can further comprise additional steps such as freezing the formed concentrated polyester particles containing iron oxide pigment; and optionally subjecting the freeze dried polyester particles to a vacuum to remove ice by sublimation.

The polyester particles containing iron oxide pigment may be applied to a substrate by electrostatic spray, either through tribo or corona charging, and can also be applied by fluidized bed. The coating is heat-cured at a temperature in the range 90° C. to 180° C., most preferably 100° C. to 150° C.

The substrate that can be coated with the particles disclosed herein include metals and metal alloys including aluminum, zinc, steel, iron, brass, bronze, copper, lead.

Amorphous Polyester Resin

The particle composition includes an amorphous polyester resin. The amorphous polyester resin may be formed by reacting a diol with a diacid in the presence of an optional catalyst. Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecane diacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacid or diester may be present, for example, in an amount from about 40 to about 60 mole percent of the resin, in embodiments from about 42 to about 52 mole percent of the resin, in embodiments from about 45 to about 50 mole percent of the resin.

Examples of diols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl) oxide, dipropylene glycol, dibutylene, and combinations thereof. The amount of organic diol selected can vary, and may be present, for example, in an amount from about 40 to about 60 mole percent of the resin, in embodiments from about 42 to about 55 mole percent of the resin, in embodiments from about 45 to about 53 mole percent of the resin.

Polycondensation catalysts which may be utilized in forming either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin. In embodiments, suitable amorphous resins include polyesters, polyamides, polyimides, polyolefins, polyethylene, polybutylene, polyisobutyrate, ethylene-propylene copolymers, ethylene-vinyl acetate copolymers, polypropylene, combinations thereof, and the like. Examples of amorphous resins which may be utilized include alkali sulfonated-polyester resins, branched alkali sulfonated-polyester resins, alkali sulfonated-polyimide resins, and branched alkali sulfonated-polyimide resins. Alkali sulfonated polyester resins may be useful in embodiments, such as the metal or alkali salts of copoly(ethylene-terephthalate)-copoly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfo-isophthalate), copoly(propylene-butylene-terephthalate)-copoly(propylene-butylene-5-sulf-o-isophthalate), copoly(propoxylated bisphenol-A-fumarate)-copoly (propoxylated bisphenol A-5-sulfo-isophthalate), copoly (ethoxylated bisphenol-A-fumarate)-copoly(ethoxylated bisphenol-A-5-sulfo-isophthalate), and copoly(ethoxylated bisphenol-A-maleate)-copoly(ethoxylated bisphenol-A-5-sulfo-isophthalate), wherein the alkali metal is, for example, a sodium, lithium or potassium ion.

In embodiments, as noted above, an unsaturated amorphous polyester resin may be utilized as a latex resin. Examples of such resins include those disclosed in U.S. Pat. No. 6,063,827, the disclosure of which is hereby incorporated by reference in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly (propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, a suitable polyester resin may be an amorphous polyester such as a poly(propoxylated bisphenol A co-fumarate) resin having the following formula (I):

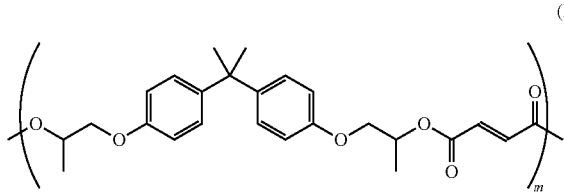

wherein m may be from about 5 to about 1000. Examples of such resins and processes for their production include those disclosed in U.S. Pat. No. 6,063,827, the disclosure of which is hereby incorporated by reference in its entirety.

An example of a linear propoxylated bisphenol A fumarate resin which may be utilized as a latex resin is available under the trade name SPARII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C., and the like.

In embodiments, the resins utilized as the resin coating may have a glass transition temperature of from about 30° C. to about 120° C., in embodiments from about 40° C. to about 100° C. In further embodiments, the resins utilized as the resin coating may have a melt viscosity of from about 10 to about 1,000,000 Pa*S at about 130° C., in embodiments from about 20 to about 100,000 Pa*S.

Polymeric Stabilizers

Non-limiting exemplary polymeric stabilizers may include poly(vinyl acetate), poly(methyl methacrylate), poly (acrylonitrile), poly(dimethylsiloxane), poly(vinyl chloride), poly(ethylene), poly(propylene), poly(lauryl methacrylate), poly(oxyethylene), poly(acrylamide), poly(vinyl alcohol), poly(acrylic acid), poly(methacrylic acid), poly (vinyl pyrrolidone), poly(ethylene imine), poly(vinyl methyl ether), poly(4-vinylpyridine), poly(12-hydroxystearic acid), poly(isobutylene), cis-1:4-poly(isoprene), carboxymethyl cellulose, gelatin, TWEEN™ 80, TWEEN™ 20, hydroxypropylmethylcellulose, copovidone and polyvinylpyrrolidone, polyethyleneglycols (PEG), polymethacrylates, hypromellose acetate succinate, hypromellose phthalate, polyvinyl caprolactam-polyvinyl acetate-polyethylene glycol graft copolymer such as SOLUPLUS®, polyvinyl acetate phthalate, cellulose acetate phthalate, and combinations thereof. In certain embodiments, the polymeric stabilizer is polyvinyl alcohol, and in certain embodiments, the polyester and polymeric stabilizer may be dissolved at an elevated temperature, such as a temperature ranging from about 60° C. to about 150° C.

Water-Miscible Organic Solvent

The water-miscible organic solvent may be chosen from those known in the art, such as, for example, alcohol, acetic acid, acetone, and acetamides, such as dimethyl acetamide. In certain exemplary embodiments, the water-miscible organic solvent is dimethyl acetamide (DMAc).

Iron Oxide Pigments

Iron oxides can be naturally sourced or synthetically made. Natural iron oxides are derived from hematite ($Fe_2O_3$, ferric oxide), which is a red iron oxide mineral; limonites (FeO(OH)), which can range from yellow to brown; and magnetite ($Fe_3O_4$), which is black iron oxide. The three main synthetic methods to manufacturing iron oxides include thermal decomposition of iron salts or iron compounds, precipitation of iron salts usually accompanied by oxidation, and reduction of organic compounds by iron.

The iron oxide pigments suitable for the particles described herein include: caput mortuum (purple), hematite (black to steel, silver-gray, brown to reddish brown, red), limonite (bright lemony yellow to a drab greyish brown, goethite (brown ochre) and magnetite (black). The red and black iron oxide pigments used herein were obtained from Color-Rare Ltd.

Aqueous Solvent

The aqueous solvent that is metered into the water-miscible organic solvent may contain up to three weight percent polyvinyl alcohol.

Colloidal Silica

Colloidal silica is added to and acts as a precipitator initiator to the aqueous solution and in embodiments can be added to the water-miscible organic solvent. Colloidal silica is available LUDOX®.

The particles produced herein have and average size of from 5 microns to about 250 microns, or from about 25 microns to about 100 microns, or from 40 microns to about 80 microns. The particles have about 2 weight percent to about 60 weight percent iron oxide pigment, or in embodiments from about 5 weight percent to about 50 weight percent, or from 10 weight percent to about 25 weight percent.

Geometric standard deviation ($\sigma g$) measures the spread of particle diameters of the particles disclosed herein. Geometric standard deviation is determined mathematically by the equation: $\sigma g = D84.13/D50 = D50/D15.87$, where D50 is median particle diameter. The value of $\sigma g$ determines the slope of the least-squares regression curve diameter to the diameter at ±1 sd ($\sigma$) from the median diameter. The particles disclosed herein have a number average geometric standard deviation (GSDn) and/or a volume average geometric standard deviation (GSDv) of from about 1.3 to about 2.0, or in embodiments of from about 1.3 to about 1.8, or from about 1.4 to about 1.7.

These particles can have a circularity of from about 0.93 to about 0.999, or in embodiments from about 0.95 to about 0.995, or from about 0.96 to about 0.990. Circularity can be determined for example with a Sysmex FPIA-3000 Particle Characterization System or a Sysmex FPIA-2100 Flow Particle Image Analyzer, both available from Malvern Instruments Ltd. (Worcestershire, UK). In flow particle image analysis, a sample is taken from a dilute suspension of particles, and this suspension is then passed through a measurement cell where images of the particles are captured, such as with stroboscopic illumination and a CCD camera. A digital image of each particle is extracted and quantified, such as by identifying particle pixels from background pixels using differences in greyscale levels ("thresholding") and by tracing the perimeters of individual particles and calculating their areas by edge definition.

Circularity is a measure of how closely a shape approaches a circle. Circularity is defined as a circumference of circle of having the same area as the particle divided by the actual perimeter of the particle. The more spherical the particle the closer the circularity is to 1, the more elongated or rough-edged the particle is, the lower the circularity. Circularity can be represented by: $2\sqrt{\pi A_p}/P_p$ where $A_p$ is the circumference of a circle having the same area as the particle and $P_p$ is ther perimeter of the particle.

Sphericity is the measure of how closely the shape of an object approaches that of a mathematically perfect sphere. Sphericity ($\Psi$) of a particle is: the ratio of the surface area of a sphere (with the same volume as the given particle) to the surface area of the particle:

$$\Psi = (\pi^{1/3}(6V_p)^{2/3})/A_p$$

where $V_p$ is volume of the particle and $A_p$ is the surface area of the particle. The sphericity of a sphere is unity by definition and, by the isoperimetric inequality, any particle which is not a sphere will have sphericity less than 1. The sphericity can be estimated by squaring the circularity measurement. The particles disclosed herein have a sphericity of from about 0.86 to about 0.998, or in embodiments of from 0.903 to about 0.990 or from 0.92 to about 0.980.

Various aspects of the embodiments of interest now will be exemplified in the following non-limiting examples. While embodiments have been illustrated with respect to one or more implementations, alterations and/or modifications can be made to the illustrated examples without departing from the spirit and scope of the appended claims. In addition, while a particular feature herein may have been disclosed with respect to only one of several implementations, such feature(s) may be combined with one or more other features of the other implementations as may be desired and advantageous for any given or particular function.

EXAMPLES

Synthesis of Iron Oxide-Based Polyester Particles Containing Silica Additive (Example 1)

Into a one liter, three-necked round bottom flask was added 64.2 g. of polyester resin, 10 grams of the total 17.3 grams red iron oxide pigment and 14.3 grams of polyvinyl alcohol (78K, PVA) in dimethyl acetamide (DMAc, 441.0 grams). Mixing at about 500 rpm was started to dissolve the polymer. At 56° C., the left over 7.3 grams of iron oxide pigment was mixed with 65.3 grams colloidal silica (30 weight percent solution, 19.6 grams Si) and was added to help "pre-seed" the water-miscible organic solvent phase before metering the aqueous solvent into the water-miscible organic solvent phase. The polymer/organic solution was heated up to 90° C. and a solution of PVA/Si in deionized water (4.11 grams 78K PVA in 227.5 grams deionized water (DIW)); 15.1 grams of 30 weight percent colloidal Si) was added dropwise to the flask with a drop funnel while stirring at 480 RPM for the first 40 minutes then the RPM was reduced to 350. After about 10 minutes of adding the aqueous PVA solution, the solvent solution went from clear light yellow to a white opaque. After about 90 minutes the aqueous PVP/Si solution was all added. The heating was stopped within 10 minutes. The opaque solution was left to cool and left stirring overnight at 350 RPM. Next day the solution was transferred to a one liter centrifuge bottle and centrifuged at 3000 RPM for 15 minutes to remove the DMAc/DIW mixture. The particles were re-suspended in DIW and mixed by shaking for about 30 seconds before centrifuging again at 3000 RPM for 15 minutes. This wash/centrifuge procedure was repeated one more time before concentrating particles and transferring to a freeze-drier bottle. The particle slurry was rapidly frozen and then placed on freeze drier which subjected the bottled particles to a high vacuum that removes ice by sublimation.

Two other sets of polyester particles were formulated with red and black iron oxide pigments. Example 2 was formulated with red iron oxide pigment and contained both high and low molecular weight amorphous polyesters (1:1). Example 3 was also made with the high molecular weight polyester but was formulated with the black iron oxide pigment instead of the red. The colloidal silica used in these experiments was a 30 weight percent suspension in water, LUDOX® AM. The loading of silica for these experiments was from 13 to 21 weight percent but after washing and drying the amount of silica detected by ICP is quite low. In Example 1 silica was added to both the organic phase (mixed with pigment) and antisolvent (aqueous PVA) solution which was metered into the organic phase. For Example 3 a portion of silica was added up front with the organic phase/polyester while the remaining amount was mixed with the antisolvent solution and added by a glass drop funnel into the round bottom flask. Example 2 did not contain any silica in its formulation while Example 3 was the only powder that contained Primid QM-1260, a thermally initiated crosslinking agent (added with organic phase). The compositional analysis is shown in Table 1.

TABLE 1

Composition of Iron oxide Containing Microparticles for Powder Coating Applications

| Particle Formulation | Example 1 | Example 2 | Example 3 |
| --- | --- | --- | --- |
| Ratio of low to high molecular weight polyester | 0:1 | 0:1 | 0:1 |
| Type of Iron Oxide Pigment | Red | Red | Black |
| Weight Percent Iron Oxide Pigment | 20.94% | 12.84% | 21.12% |
| ppm Silicon (as detected by Inductively Coupled Plasma) | 2068 | 785 | 422 |
| Weight Percent Primid QM-1260 crosslinking agent | None | None | 4.13% |
| Particle size range | 25.8 ± 6.4 µm | 84 ± 16 µm | Not imaged |

Example 1 had a much tighter number-based particle distribution and was also much smaller in average size compared to Example 2. Example 2 had the lowest molecular weight since it only contains both the higher and lower molecular weight resins which will reduce the average molecular weight of the overall bulk sample. Example 3 had the highest molecular weight (even higher than Example 1) due to the addition of a crosslinking agent which increased both the molecular weight. The final iron concentration varies from sample to sample due to amount of pigment added in the formulation. The amount of silicon varied with the amount colloidal silica added to formulation, process of addition and how much was retained in particles after washing.

Figure 2:
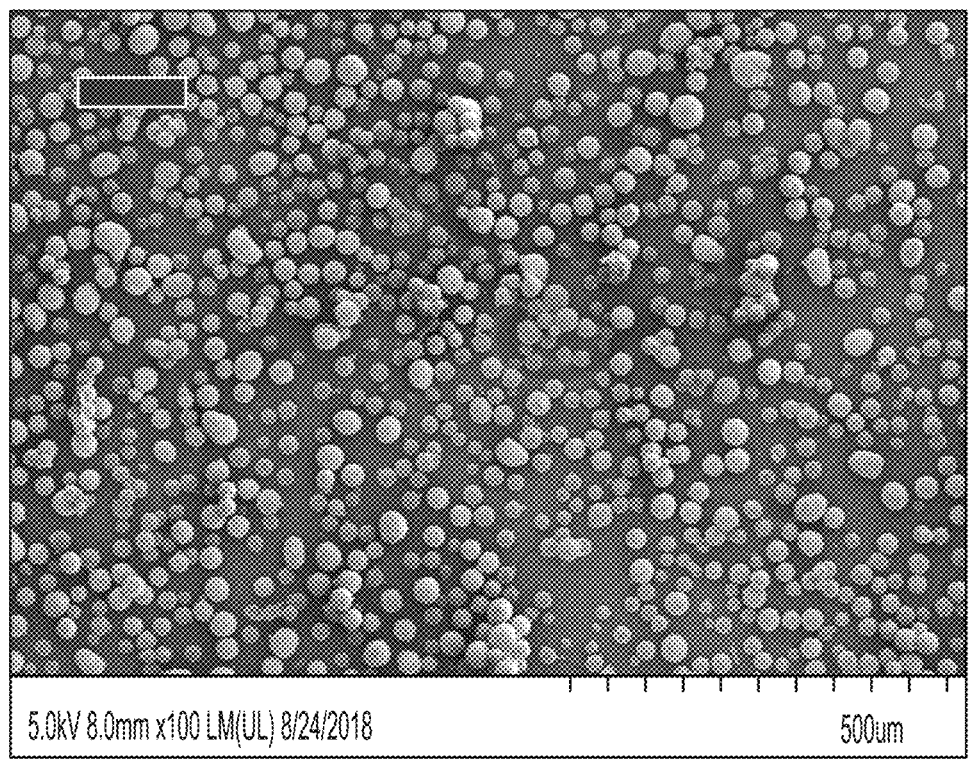
FIG. 2 is an SEM image of powder particles according to the disclosure provided herein.
Figure 3:
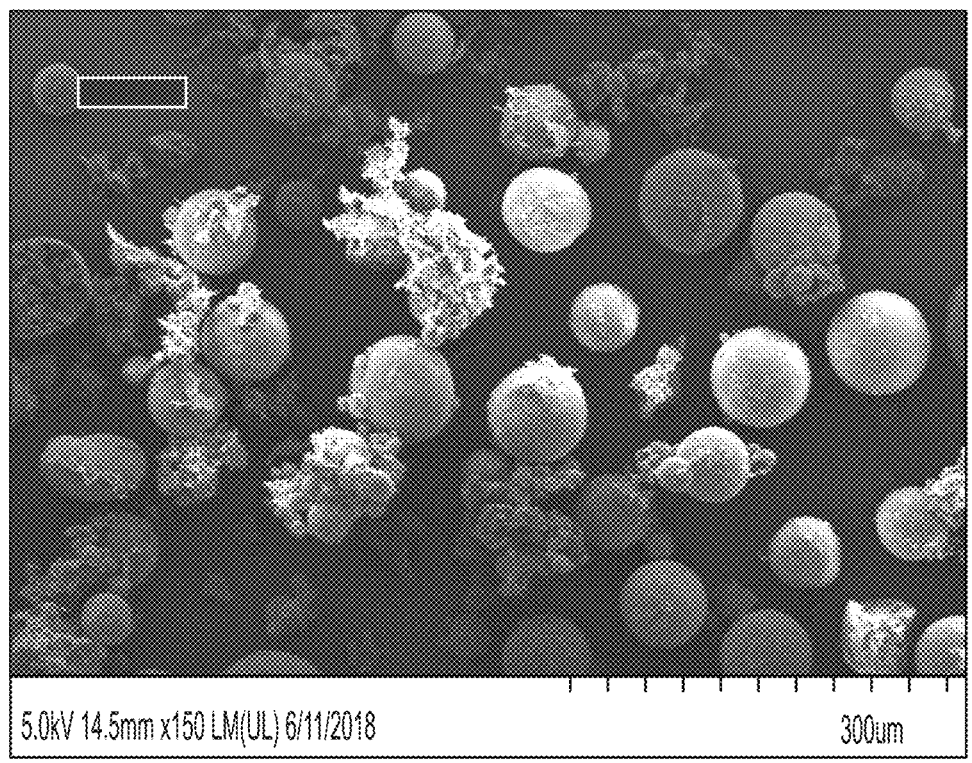
FIG. 3 is an SEM image of powder particles according to the disclosure provided herein.

The SEM images in FIG. 2 clearly show that the Example 1 particles are spherical and very similar in size (narrow distribution around 25 μm). The surface of the particles are coated with pigment but otherwise are quite well defined and flowed very well. The circularity of the particles of Example 1 were from 0.995 to 0.998. FIG. 3 show an SEM image of the particles produced in Example 2. The circularity of the particles in FIG. 3 was above 0.99.

The powder from Example 1 was applied to an aluminum substrate with a Nordson corona-charging gun. Corona guns have consistent charging making them very successful in achieving a consistent film build, especially if thin film thicknesses are desired. During corona charging, a high voltage potential is developed at an electrode located in or near the powder stream. The powder particles become negatively charged and are attracted to the grounded substrate.

The powder coating was applied to the aluminum substrate with the Nordson ENCORE® XT Manual Powder Coating Spray System. The system was set to Charge Mode 1 where the voltage is set at 100 kV to charge the powder particles as they pass through the gun and the electrical current is set to 15 μA which indicates how much charge is moving from the gun's electrode to the cloud of air and powder exiting the gun, and then onto the surface of the part being coated.

The particles of Example 1 showed an excellent distribution of particles and an abundance of pigment on the surface of the particles. The particles of Example 1 also flowed well upon melting. Silica used in the coating helps in the free flow of the powder onto the aluminum substrate. Silica is known to provide tribo-charging, free-flow, fluidization and anti-blocking in powder coating applications. The particles of Example 1 produced a smooth glossy but textured surface while the particles of Example 2 produced a matte finish.

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled in the art which are also encompassed by the following claims.

What is claimed is:

1. A process comprising:
   forming a composition of an amorphous polyester, a polymeric stabilizer, and an iron oxide pigment in a water-miscible organic solvent wherein the amorphous polyester and polymeric stabilizer are solubilized in the water miscible organic solvent;
   dispersing a polyvinyl alcohol aqueous solution containing colloidal silica into the composition, while mixing, to form a dispersion containing precipitated particles of amorphous polyester and iron oxide pigment; and
   separating the precipitated particles from the solvent.

2. The method of claim 1, wherein the polymeric stabilizer is selected from the group consisting of: poly(vinyl acetate), poly(methyl methacrylate), poly(acrylonitrile), poly(dimethylsiloxane), poly(vinyl chloride), poly(ethylene), poly(propylene), poly(lauryl methacrylate), poly(oxyethylene), poly(acrylamide), poly(vinyl alcohol), poly (acrylic acid), poly(methacrylic acid), poly(vinyl pyrrolidone), poly(ethylene imine), poly(vinyl methyl ether), poly(4-vinylpyridine), poly(12-hydroxystearic acid), poly(isobutylene), cis-1:4-poly(isoprene), carboxymethyl cellulose, gelatin, hydroxypropylmethylcellulose, copovidone and polyvinylpyrrolidone, polyethyleneglycols (PEG), polymethacrylates, hypromellose acetate succinate, hypromellose phthalate, polyvinyl caprolactam-polyvinyl acetate-polyethylene glycol graft copolymer, polyvinyl acetate phthalate, cellulose acetate phthalate, polyvinyl alcohol and combinations thereof.

3. The method of claim 1, wherein the iron oxide pigment is selected from the group consisting of: caput mortuum, hematite, limonite, goethite and magnetite.

4. The method of claim 1, wherein the water miscible organic solvent is selected from the group consisting of: dimethylacetamide, acetic acid, diethylene glycol dimethyl ether, dimethylformamide, 1,4-dioxane, ethylene glycol, hexamethylphosphoramide, hexamethylphosphorous triamide, pyridine, acetone, and combinations thereof.

5. The method of claim 1, wherein the precipitated particles have an average particle size of from about 5 microns to about 250 microns.

6. The method of claim 1, wherein the precipitated particles comprise from about 2 weight percent to about 60 weight percent iron oxide pigment.

7. The method of claim 1, wherein the separating comprises centrifuging the precipitated particles.

8. The method of claim 1, wherein the separating comprises filtering the precipitated particles.

9. The method of claim 1, wherein precipitated particles have a circularity of from about 0.93 to about 0.999.

10. The method of claim 1, wherein amorphous polyester is formed by reacting a diol with a diacid optionally in the presence of catalyst.

11. The method of claim 1, wherein a spread of particle diameters of the precipitated particles have an average geometric standard deviation of from about 1.3 to about 2.0.

12. The method of claim 1, further comprising:
    re-dispersing the precipitated particles in water;
    freezing the re-dispersed precipitated particles; and
    removing the water through sublimation.

13. A method of coating a substrate comprising:
    providing a plurality of particles comprising amorphous polyester and iron oxide pigment, wherein the plurality of particles have a size of from 5 microns to 2500 microns and wherein the plurality of particles each have a circularity of from about 0.93 to about 0.999, wherein the plurality of particles are provided by the method of:
       forming a composition of an amorphous polyester, a polymeric stabilizer, and an iron oxide pigment in a water-miscible organic solvent, wherein the amorphous polyester and polymeric stabilizer are solubilized in the water miscible organic solvent;
       dispersing a polyvinyl alcohol aqueous solution containing colloidal silica into the composition, while mixing, to form a dispersion containing precipitated particles of amorphous polyester and iron oxide pigment; and
       separating the precipitated particles from the solvent;
    electrostatically applying the plurality of particles to the substrate; and
    heating the plurality of particles to a temperature above the melting point of the amorphous polyester.

14. The method of claim 13, wherein the iron oxide pigment is selected from the group consisting of: caput mortuum, hematite, limonite, goethite and magnetite.

15. The method of claim 13, wherein the iron oxide pigment comprises from about 2 weight percent to about 60 of the plurality of particles.

16. The method of claim 13, wherein the substrate comprises metals and metal alloys selected from the group consisting of: including aluminum, zinc, steel, iron, brass, bronze, copper, lead.

\* \* \* \* \*